United States Patent
Knapp

(10) Patent No.: US 11,400,782 B2
(45) Date of Patent: Aug. 2, 2022

(54) AXLE ASSEMBLY AND METHOD OF MANUFACTURE THEREOF

(71) Applicant: SpringSeal, Inc., Ravenna, OH (US)

(72) Inventor: Mark Knapp, Ravenna, OH (US)

(73) Assignee: Springseal, Inc., Ravenna, OH (US)

( * ) Notice: Subject to any disclaimer, the term of this patent is extended or adjusted under 35 U.S.C. 154(b) by 0 days.

(21) Appl. No.: 16/987,637

(22) Filed: Aug. 7, 2020

(65) Prior Publication Data
US 2021/0039464 A1 Feb. 11, 2021

Related U.S. Application Data

(60) Provisional application No. 62/883,906, filed on Aug. 7, 2019.

(51) Int. Cl.
*B60G 9/00* (2006.01)
*B60B 35/04* (2006.01)
(Continued)

(52) U.S. Cl.
CPC ............ *B60G 9/00* (2013.01); *B60B 35/04* (2013.01); *F16F 1/373* (2013.01); *F16F 3/0935* (2013.01);
(Continued)

(58) Field of Classification Search
CPC ............ B60G 9/00; B60G 2200/31; B60G 2800/162; B60G 2202/14; B60G 2202/142; B60G 2206/42; B60G 2206/73; B60G 2206/8105; B60G 2206/82; B60G 2204/41; B60G 2204/4104; B60G 11/225; B60B 35/04; B60B 35/08; B60B 2320/10; B60B 2360/50; F16F 1/373; F16F 1/545; F16F 2226/04; F16F 2228/007; F16F 2234/00; F16F 2226/026; F16F 2224/025;
(Continued)

(56) References Cited

U.S. PATENT DOCUMENTS 3,779,576 A * 12/1973 Malcolm .............. B60G 11/225
280/684
6,905,130 B2 * 6/2005 Few ..................... B60G 11/225
280/124.134
(Continued)

FOREIGN PATENT DOCUMENTS

DE 202013009443 U1 * 11/2013 ............. B60G 3/145
DE 202015008166 U1 * 12/2015 ........... B60G 11/225
FR 2994128 A1 * 2/2014 ............. B60G 15/14

OTHER PUBLICATIONS

Description Translation for DE 202015008166 from Espacenet (Year: 2020).*

*Primary Examiner* — Jonathan Ng
*Assistant Examiner* — Daniel M. Keck
(74) *Attorney, Agent, or Firm* — Tarolli, Sundheim, Covell & Tummino LLP; John A. Yirga, Esq.

(57) ABSTRACT

Described herein is an axle assembly and method of fabrication thereof. The axle assembly includes an axle having a first geometric shape housed within an axle housing having a second geometric shape. A shock absorber is located between the axle and the axle housing. The shock absorber supports the axle within the axle housing and comprises a first material and comprises a multi-sided configuration. The first geometric shape and the second geometric shape comprising polygons.

21 Claims, 13 Drawing Sheets

(51) Int. Cl.
*F16F 1/373* (2006.01)
*F16F 3/093* (2006.01)
(52) U.S. Cl.
CPC ... *B60B 2310/214* (2013.01); *B60B 2310/316* (2013.01); *B60B 2310/616* (2013.01); *B60B 2320/10* (2013.01); *B60B 2360/50* (2013.01); *B60B 2900/112* (2013.01); *B60B 2900/113* (2013.01); *B60G 2200/31* (2013.01); *B60G 2202/14* (2013.01); *B60G 2206/42* (2013.01); *B60G 2206/73* (2013.01); *B60G 2206/8105* (2013.01); *B60G 2206/82* (2013.01); *B60G 2800/162* (2013.01); *F16F 2224/025* (2013.01); *F16F 2226/026* (2013.01); *F16F 2226/04* (2013.01); *F16F 2226/045* (2013.01); *F16F 2228/007* (2013.01); *F16F 2234/00* (2013.01)

(58) Field of Classification Search
CPC .......... F16F 2226/045; F16F 2310/214; F16F 2310/616; F16F 2310/316
See application file for complete search history.

(56) References Cited

U.S. PATENT DOCUMENTS

| | | | |
|---|---|---|---|
| 8,191,911 B1* | 6/2012 | Reynolds | B60G 11/225 |
| | | | 280/124.166 |
| 2020/0247183 A1* | 8/2020 | Macken | B21D 53/88 |
| 2021/0001938 A1* | 1/2021 | Beiler | B60G 11/185 |

* cited by examiner

AXLE ASSEMBLY AND METHOD OF MANUFACTURE THEREOF

CROSS REFERENCE TO RELATED APPLICATION

The present application is a non-provisional application that claims priority under 35 U.S.C. § 119 (e) to U.S. Provisional Application Ser. No. 62/883,906 entitled AXLE ASSEMBLY AND METHOD OF MANUFACTURE THEREOF that was filed on Aug. 7, 2019 with the United States Patent Office. The present application claims priority to said provisional application, which is incorporated by reference in its entirety for all purposes.

TECHNICAL FIELD

The present disclosure relates to axle assemblies and a method of manufacturing the same, and more specifically axle assemblies for use in trailers, campers, or any other over-the-road vehicle using a straight axle.

BACKGROUND

Axle assemblies in the trailer and/or motor home industry typically are manufactured using a cryogenic process to freeze rubber to assemble an axle. This process is time and labor intensive, as cylindrical cords are compressed, and then are super-cooled to maintain the contraction of the cord. As the cylindrical cord thaws it expands. The contracted cords, along with an axle are then inserted simultaneously into an axle housing, as shown by Kendon Stand-Up and EZ lube HUBS. The energy cost to freeze rubber combined with the time constraints (the rubber and axle must be housed within the axle housing before the rubber warms up and expands) makes this method costly and labor intensive.

SUMMARY

One example embodiment of the present disclosure includes an axle assembly comprising an axle having a first geometric shape housed within an axle housing having a second geometric shape. The axle assembly further comprises a shock absorber between the axle and the axle housing; the shock absorber supports the axle within the axle housing. The shock absorber comprises a first material and having a three-sided configuration. The first geometric shape and the second geometric shape comprising quadrilaterals.

Another example embodiment of the present disclosure includes an axle assembly comprising an axle having a first geometric shape housed within an axle housing having a second geometric shape, a shock absorber between the axle and the axle housing, the shock absorber comprises one or more flexible components, each of the one or more flexible components comprising at least a first lateral side, a second lateral side, and an inner side, the shock absorber supporting the axle within the axle housing, the first geometric shape and the second geometric shape comprising polygons, the one or more flexible components comprising a slip coat covering at least one of the first lateral side and the second lateral side comprising a first material, the first lateral side and the second lateral side in contact with the axle housing when assembled.

Yet another example embodiment of the present disclosure includes an axle assembly comprising an axle having a first geometric shape housed within an axle housing having a second geometric shape, a shock absorber between the axle and the axle housing, the shock absorber comprises one or more flexible components, each of the one or more flexible components comprising a first lateral side, a second lateral side, and an inner side, the shock absorber supporting the axle within the axle housing, the first geometric shape and the second geometric shape comprising polygons. The one or more flexible components including a rigid material comprising a 60-80 Shore D material, at least a portion of the rigid material in contact with the axle when assembled, a first material comprising a 55-75 Shore A material, the first material supported by the rigid material, and a slip coat supported by the first material, the slip coat covering at least one of the first lateral side and the second lateral side comprising the first material, the first lateral side and the second lateral side in contact with the axle housing when assembled.

Another aspect of the present disclosure includes a method of manufacturing an axle assembly comprising the steps of providing an axle housing for positioning an axle within an internal opening surrounded by at least one wall; providing an axle that is inserted into the axle housing; positioning a shock absorber between the axle and the axle housing; forming the shock absorber from one or more flexible components, each of the one or more flexible components comprising a lateral side and an inner side, the shock absorber supporting the axle within the axle housing; the one or more flexible components further comprising a first material having a first elasticity value and a second material having a second elasticity value wherein the first elasticity value is not equal to the second elasticity value; and applying a coating along at least a portion of the first material such that at least a portion of the coating is in contact with the axle housing when assembled.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the figures generally wherein like numbered features shown therein refer to like elements throughout unless otherwise noted. The present disclosure relates to axle assemblies and a method of making the same, and more specifically axle assemblies for use in trailers, campers, or any other over-the-road vehicle using a straight axle.

Figure 9:
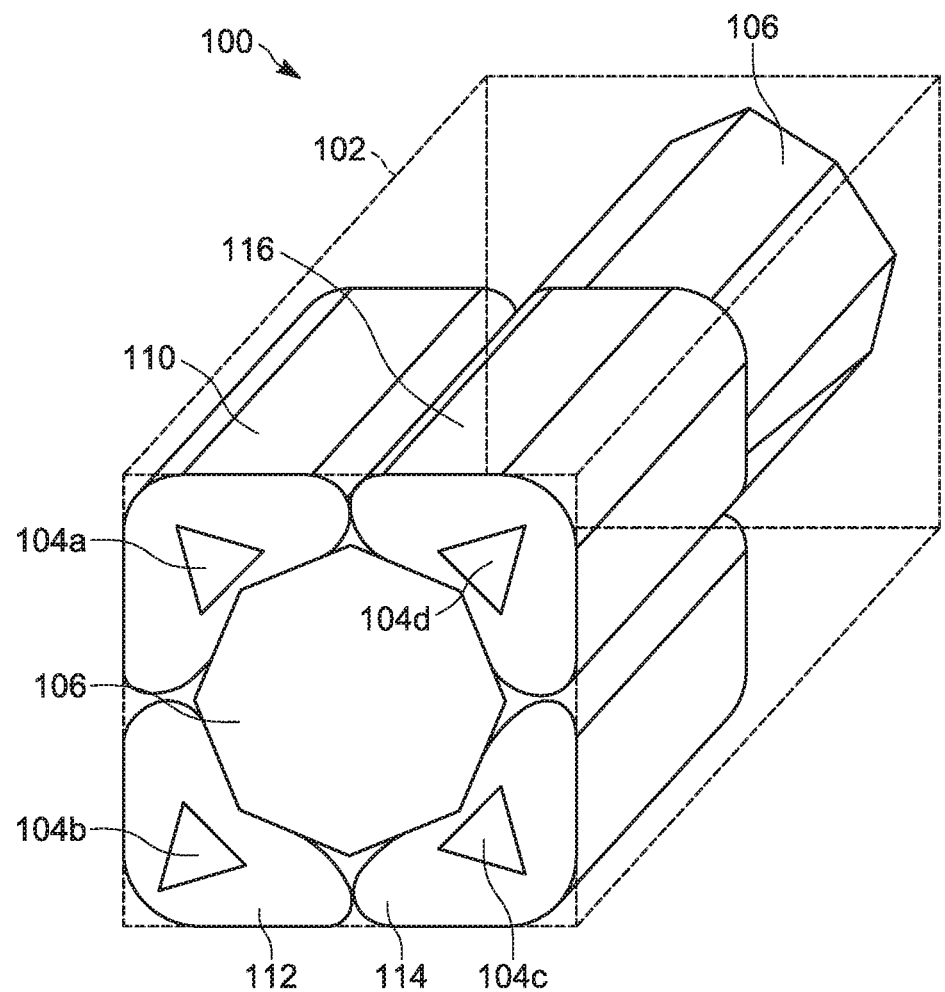
FIG. 9 is a partial front perspective view of an axle assembly having an axle having a second geometric shape constructed in accordance with another example embodiment of the present disclosure.

Referring to the FIGS. 1-5, a first end of an axle assembly 100 constructed in accordance with one embodiment of the disclosure. In the example embodiment, an axle 106 extends along a lateral axis LA and is housed within an axle housing 102, shown in phantom in FIGS. 3, and 4A. In the illustrated example embodiment, the axle 106 and the axle housing 102 have a square shaped geometry. However, it would be appreciated by one of ordinary skill in the art that the axle 106 can comprise multiple geometric shapes, such as a rectangle, a triangle, a circle, or other polygons (see, for example, FIG. 9).

The axle 106 comprises a first cross-sectional area 141, wherein in one example embodiment, the first cross-sectional area is between approximately 0.75 square inches to approximately 1.25 square inches. In another example embodiment, the first cross-sectional area is 1 square inch (see FIG. 2). Additionally, it would be appreciated by one of ordinary skill in the art that the axle housing 102 can comprise multiple geometric shapes, such as a rectangle, a triangle, a circle, or other polygons. Further, the geometric shape of the axle 106 can comprise a different geometric shape than the geometric shape of the axle housing 102. The axle housing 102 comprises a second cross-sectional area 145, wherein in one example embodiment, the second cross-sectional area is between approximately 3.0 square inches to approximately 4.0 square inches. In another example embodiment, the second cross-sectional area is 3.4702 square inches (see FIG. 2). A shock absorber 109 is located between the axle 106 and the axle housing 102. The shock absorber 109 supports the axle 106 within the axle housing 102. In the illustrated example embodiment, the shock absorber 109 comprises four flexible components 110, 112, 114, and 116 housing four rigid members 104a, 104b, 104c, and 104d, respectively. It would be appreciated by one of ordinary skill in the art that different numbers of flexible components and rigid members can be used. Flexible components 110, 112, 114, and 116 comprising rigid members 104 comprise a shock absorber cross-sectional area 143, wherein in one example embodiment, the shock absorber cross-sectional area is between approximately 0.25 square inches to approximately 0.75 square inches. In another example embodiment, the shock absorber cross-sectional area is 0.5042 square inches (see FIG. 2).

In an example embodiment, front surfaces 110d, 112d, 114d, and 116d (see FIG. 3) of the four flexible components 110, 112, 114, and 116 are even with a first plane 103 (see FIG. 4A), wherein the first end of the axle housing 102 (see FIG. 2) is even with the first plane. In another example embodiment, the front surfaces 110d, 112d, 114d, and 116d of the four flexible components 110, 112, 114, and 116 extend beyond the first plane 103 (see FIG. 4A).

Figure 8:
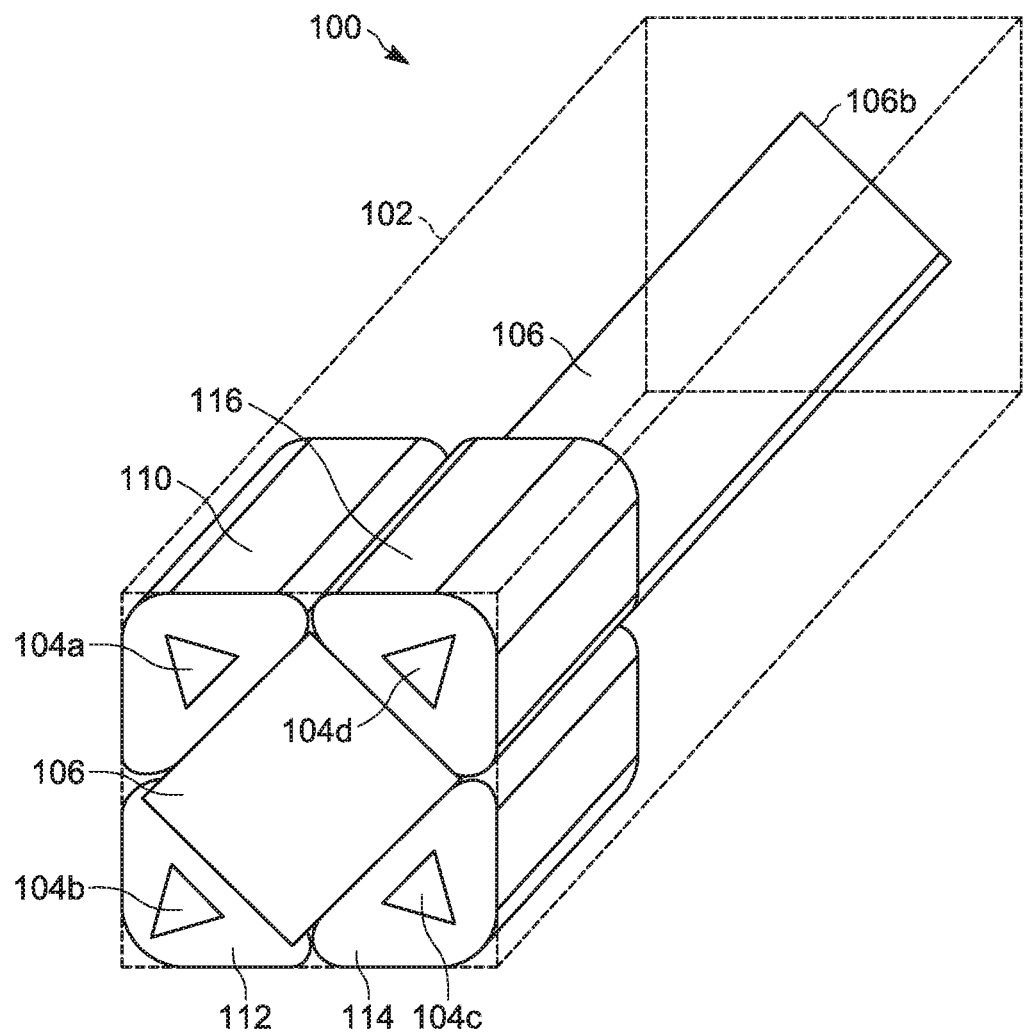
FIG. 8 is a partial front perspective view of an axle assembly constructed in accordance with another example embodiment of the present disclosure.

The four rigid members 104a-104d exert radial pressure on the four flexible components 110, 112, 114, and 116 to expand said components to generate compression pressure between the axle 106 and the axle housing 102, wherein the pressure is sufficient to maintain the relative position of the axle within the axle housing in situ. In one example embodiment, the four flexible components 110, 112, 114, 116 comprise a 55-85 Shore A material. In one example embodiment, the 55-85 Shore A material is item no. 14155 made by Teknor Apex. In another example embodiment, the four flexible components 110, 112, 114, and 116 comprise thermoplastic elastomer (TPE) such as thermoplastic vuicanizates (TPV) rubber. In the illustrated example embodiment, the four rigid members 104a-104d comprise a 60-80 Shore D material. In another example embodiment, the four rigid members 104a-104d comprise at least one of metal, plastic, and the like. Although, the four rigid members 104a-104d are illustrated as comprising a circular geometry, it would be appreciated by one of ordinary skill in the art that the four rigid members 104a-104d can comprise multiple geometric shapes, such as a rectangle, a triangle, a circle, or other polygons (see, for example, FIGS. 8-9 and 13C). Further, it would be appreciated that the rigid members 104a-104d can have a different or a same geometric shape relative to each other. Rigid members 104 comprise a rigid cross-sectional area 149 (see FIG. 4B), wherein in one example embodiment, the rigid cross-sectional area is between approximately 0.010 square inches to approximately 0.130 square inches and/or has a diameter 120 of between approximately 0.10 inches to approximately 0.40 inches. In another example embodiment, the rigid cross-sectional area 149 is 0.0491 square inches and/or the diameter 120 is about 0.250 inches (see FIG. 2).

Figure 1:
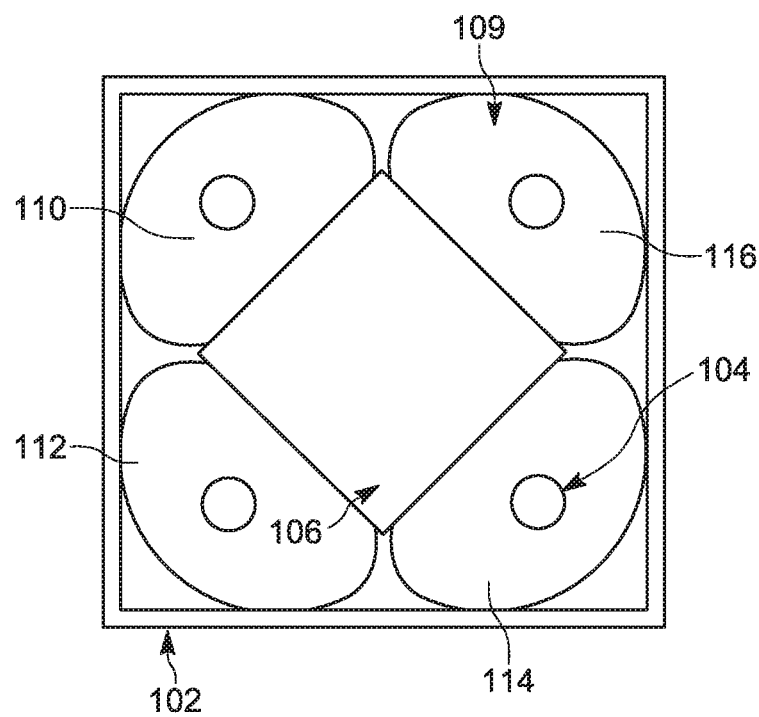
FIG. 1 is a front elevation view of a first end of an axle assembly constructed in accordance with one example embodiment of the present disclosure.
Figure 2:
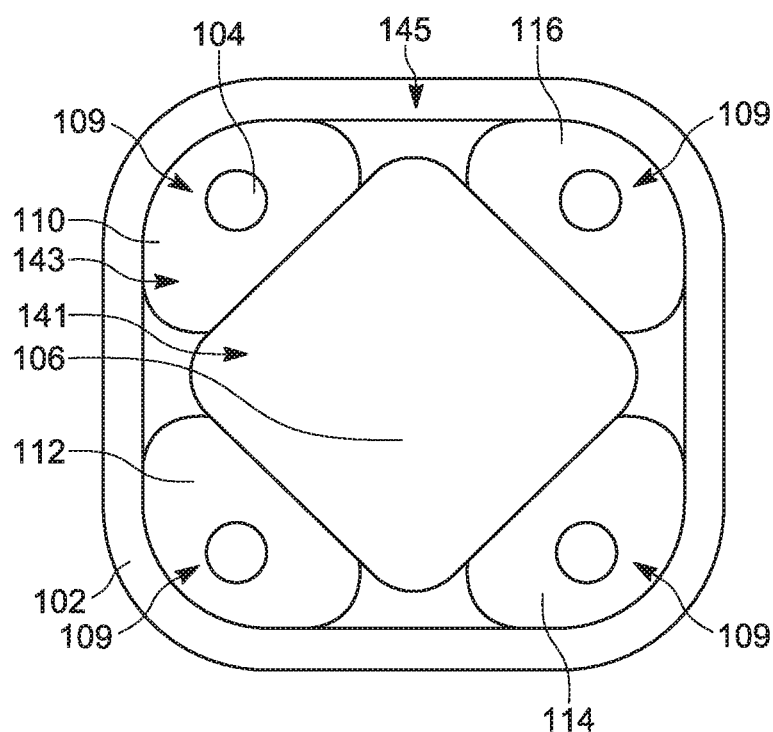
FIG. 2 is a front elevation view of a first end of an axle assembly constructed in accordance with one example embodiment of the present disclosure.
Figure 3:
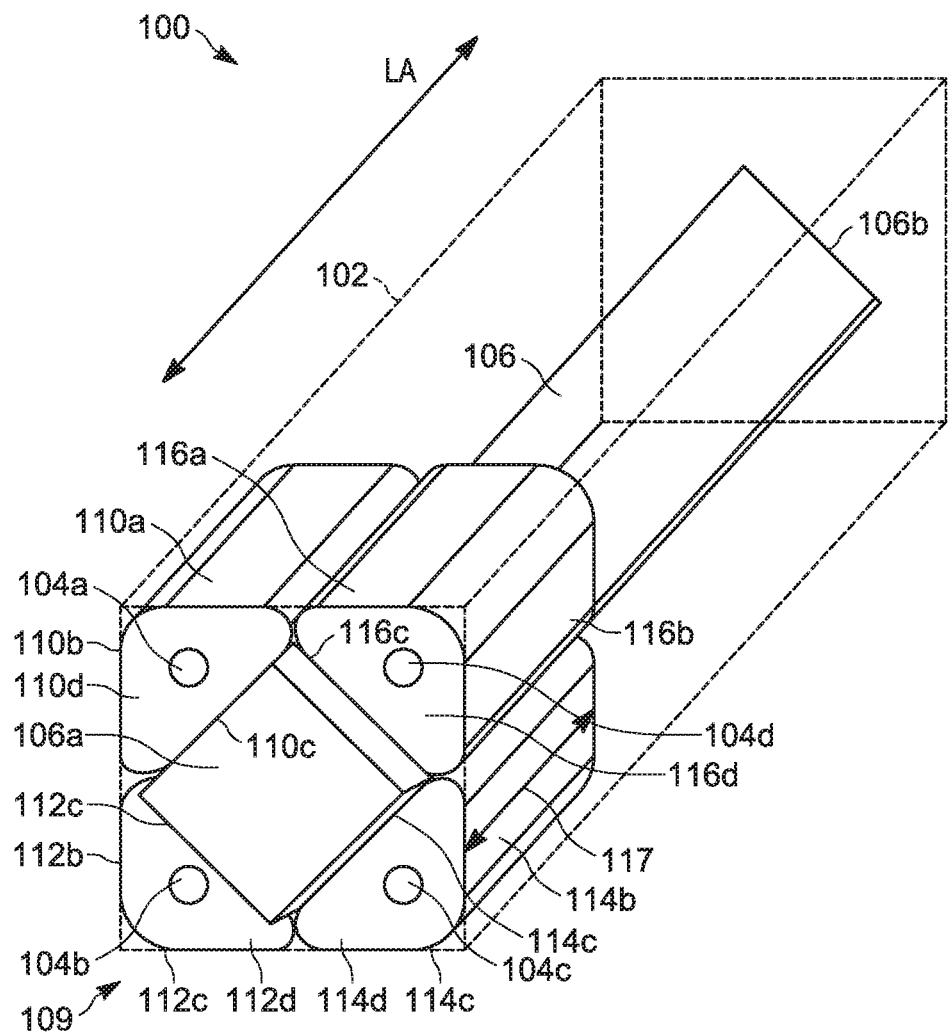
FIG. 3 is a partial front perspective view of a first end of an axle assembly constructed in accordance with one example embodiment of the present disclosure.

The rigid members 104a-104d are sized such that the members are large enough, relative to the size of the flexible components 110, 112, 114, and 116, the axle 106, and the axle housing 102, to prevent the axle 106 from rotating relative to the housing 102 more than a threshold angle. In one example embodiment, the threshold angle is approximately between about 10° to about 40°. In one example embodiment, the diameter 120 (see FIG. 4B) of the rigid members 104a-104d is increased to increase a pressure on the axle 106 responsive to a heavier axle being present and is decreased to decrease the tension on the axle responsive to a lighter axle being present. In one example embodiment, the axle assembly 100 is rated for between about 1,750 lbs to about 2,225 lbs. It should be appreciated that an increase in the rigid members' 104a-104d size increases an expansion amount of the flexible components 110, 112, 114, and 116, thus increasing the pressure between the axle 106 and the axle housing 102. Thus, the flexible components 110, 112, 114, and 116 can be inserted as shown in FIGS. 1 and 2 into the axle housing 102 to surround the axle 106 at room temperature.

In one example embodiment, a first end 106a of the axle 106 extends beyond the first plane 103 (see FIG. 4A) a first distance. Wherein in one example embodiment, the first distance is between approximately one (1") inch to approximately three (3") inches. In another example embodiment, the first distance is two (2") inches. In yet another example embodiment, the shock absorber 109 extends a first axle distance 117 into the axle housing 102 parallel to the lateral axis LA. In one example embodiment, the first axle distance 117 is between approximately six (6") inches to approximately thirty (30") inches. In another example embodiment, a second end (not shown) of the axle assembly 100 is substantially the same as the first end. That is, the axle 106 extends laterally at least the length of the axle housing 102, and a second shock absorber, that is substantially the same as the shock absorber 109, supports the axle in the axle housing at the second end in the same manner described above with regards to the first end.

Figure 4A:
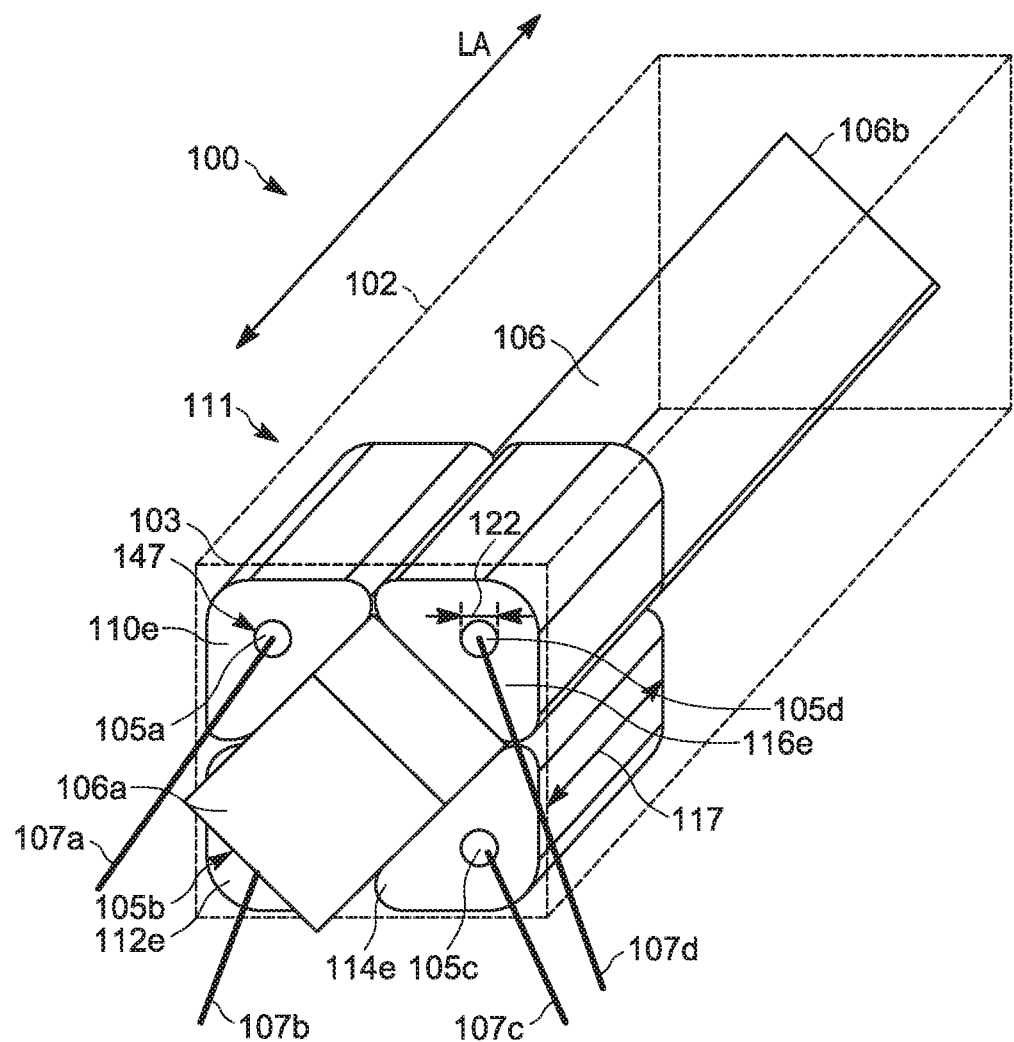
FIG. 4A is a partial front perspective view of an axle assembly during construction in accordance with one example embodiment of the present disclosure.
Figure 4B:
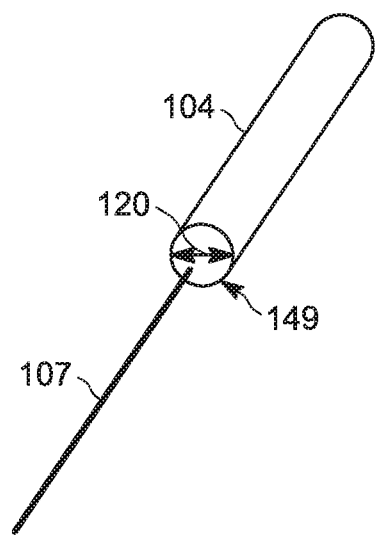
FIG. 4B is a perspective view of a pin for use in an axle assembly in accordance with one example embodiment of the present disclosure.
Figure 5:
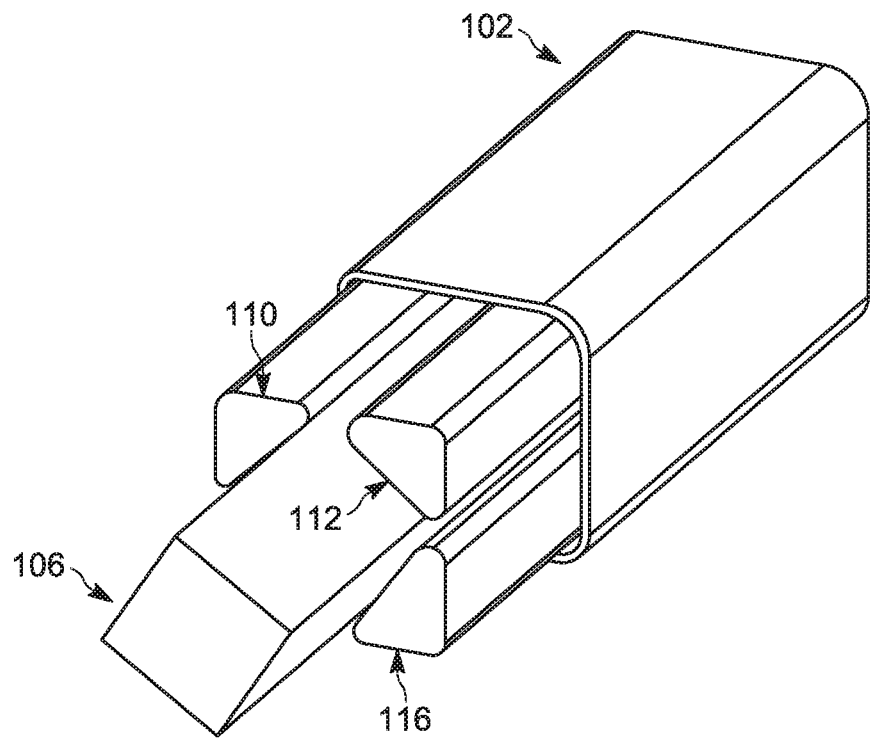
FIG. 5 is a partial front perspective view of an axle assembly during construction in accordance with one example embodiment of the present disclosure.

As in the illustrated example embodiments of FIGS. 4A-4B, the axle assembly 100 is further fabricated to form an axle arrangement 111 by inserting un-radially expanded flexible components 110e, 112e, 114e, and 116e between the axle 106 and the axle housing 102. The un-radially expanded flexible components 110e, 112e, 114e, and 116e comprise openings 105a, 105b, 105c, and 105d that extend laterally through the components. Openings 105 in the un-radially expanded flexible components 110e, 112e, 114e, and 116e comprise an opening cross-sectional area 147 (see FIG. 4A), wherein in one example embodiment, the opening cross-sectional area is between approximately 0.15 square inches to approximately 0.45 square inches and/or has an opening diameter 122 of between approximately 0.10 inches to approximately 0.40 inches. In another example embodiment, the opening cross-sectional area 147 is 0.0276 square inches and/or the opening diameter 122 is about 0.1875 inches. Leads 107a, 107b, 107c, and 107d attached to the rigid members 104a-104d are fed through the openings 105a-105d in the un-radially expanded flexible components 110e, 112e, 114e, and 116e prior to insertion of the un-radially expanded flexible components into the axle housing 102. The leads 107a-107d extend the length of the respective un-radially expanded flexible components 110e, 112e, 114e, and 116e. Once the leads 107a-107d are installed in the un-radially expanded flexible components 110e, 112e, 114e, and 116e, the components are inserted into the axle housing 102 and positioned around the axle 106 as illustrated in FIG. 4A.

In one example embodiment, the rigid members 104a-104d are inserted into the axle housing 102 first, followed by the un-radially expanded flexible components 110e, 112e, 114e, and 116e. In one example embodiment, the un-radially expanded flexible components 110, 112, 114, and 116 become radially expanded by pulling the leads 107a-107d and thus the rigid members 104a-104b through the openings 105a-105d.

In the illustrated example embodiment of FIG. 4A-4B, the rigid members 104a-104d have the diameter 120, while the openings 105a-105d have the opening diameter 122 prior to the insertion of the rigid members into said openings. In one example embodiment, the diameter 120 is greater than the opening diameter 122. In another example embodiment, a rigid member surface area to opening surface area ratio ranges between 2:1 to 4:1, such that the openings 105a-105d and the rigid members 104a-104d provide the needed level of compression between the axle housing 102 and the axle 106. In yet another example embodiment, the rigid member surface area to opening surface area ratio is 2:1.

Figure 6:
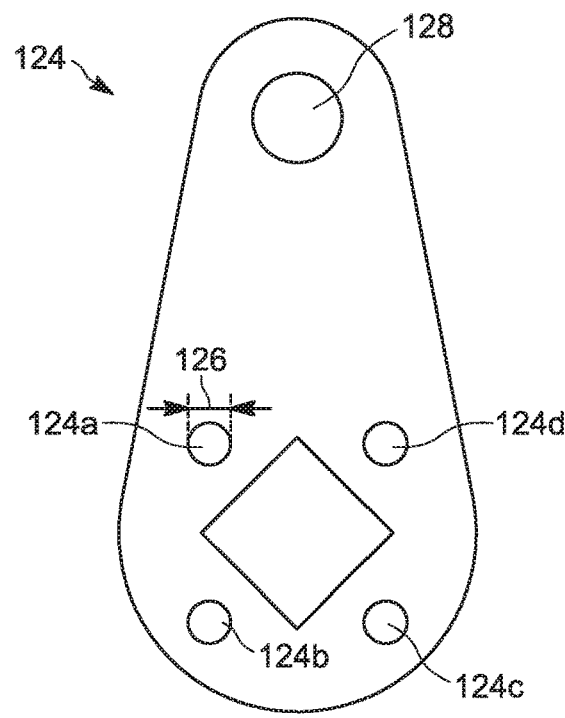
FIG. 6 is a perspective view of an assembly casting for use in an axle assembly in accordance with one example embodiment of the present disclosure.
Figure 7A:
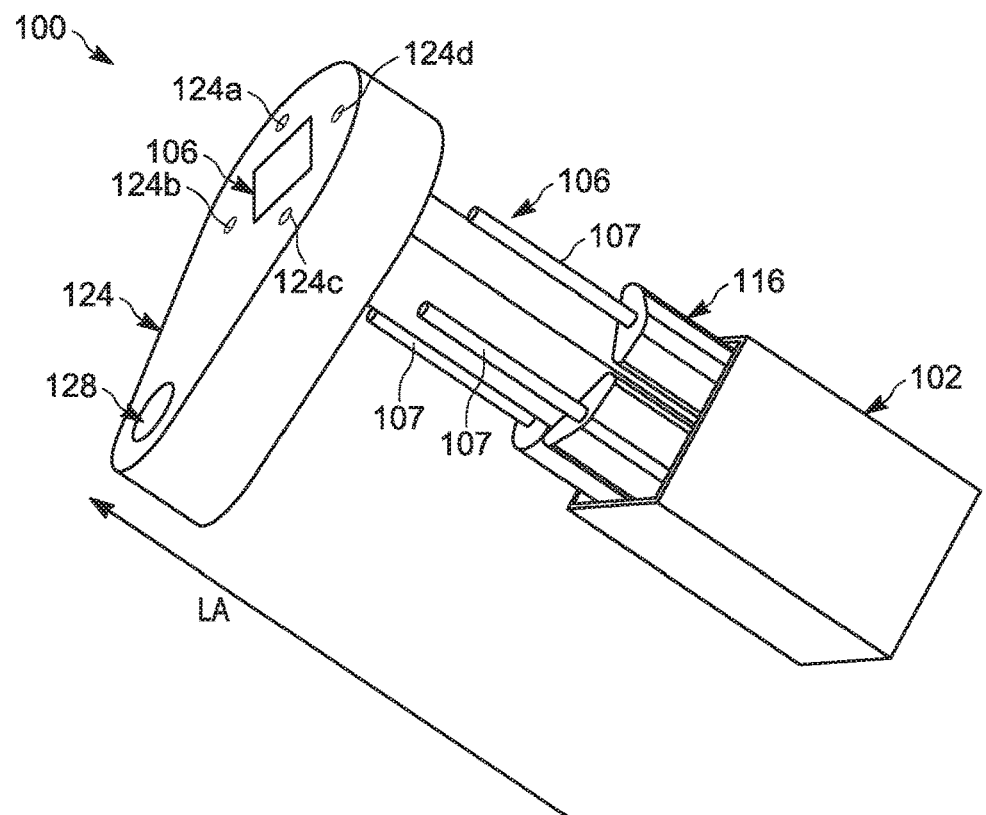
FIG. 7A is a partial front perspective view of an axle assembly comprising an assembly casting constructed in accordance with one example embodiment of the present disclosure.
Figure 7B:
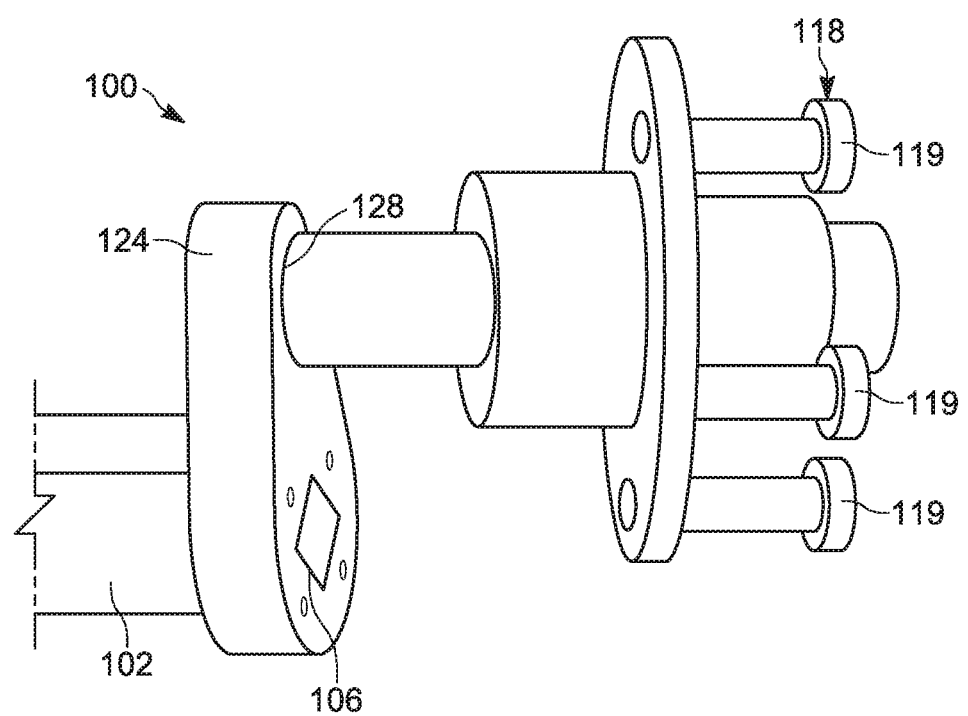
FIG. 7B is a partial side perspective view of an axle assembly comprising a wheel attachment constructed in accordance with one example embodiment of the present disclosure.

An axle casting or trailing arm 124 (see FIGS. 6, 7A, 7B) comprising an axle opening 127 is fitted over the protruding end of the axle 106, such that the axle is coupled to the axle casting 124 via the axle opening. In one example embodiment, an inner surface of the axle casting 124 is flush with the front surfaces 110d, 112d, 114d, and 116d of the four flexible components 110, 112, 114, and 116. The leads 107a-107d are threaded thorough lead openings 124a, 124b, 124c, and 124d in the axle casting 124, wherein the lead openings have diameters 126 that are greater than a diameter of the leads, but less than the diameter 120 of the rigid members 104a-104d. Although the lead openings 124a-124d are illustrated as circular, other geometric shapes are contemplated.

Forces are applied to the leads 107a-107d to pull the rigid members 104a-104d into the openings 105a-105d, thus expanding the un-radially expanded flexible components 110e, 112e, 114e, and 116e into the flexible components 110, 112, 114, and 116. The axle casting 124 prevents the flexible components 110, 112, 114, and 116 from being pulled out of the axle housing 102, while simultaneously aligning the components and the rigid members 104a-104d on the first plane 103. In one example embodiment, the fabrication of the axle assembly 100 is performed at room or ambient temperature. In the illustrated example embodiment of FIGS. 6, 7A, and 7B, the axle casting 124 comprises a wheel assembly opening 128. In an example embodiment of FIG. 7B, a wheel assembly 118 is coupled to the axle casting 124 via the wheel assembly opening 128. In the illustrated example embodiment, the wheel assembly 118 comprises lug nuts 119.

In one example embodiment, the shock absorber 109 absorbs a significant amount of shock, negating a need for leaf springs, dampers, struts, or other additional types of shock absorption when in use in a trailer or other motor vehicle. Further, the axle assembly 100 is assembled at room temperature reducing assembly costs as compared to axles that use freezing or heating in the axle assembly fabrication process. Additionally, because different components do not have to be assembled within a specific timeframe, such as within ninety (90) seconds of undergoing a freezing operation, the fabrication of the axle assembly 100 is easier, safer, less costly, and results in less damaged or unusable materials.

Figure 10:
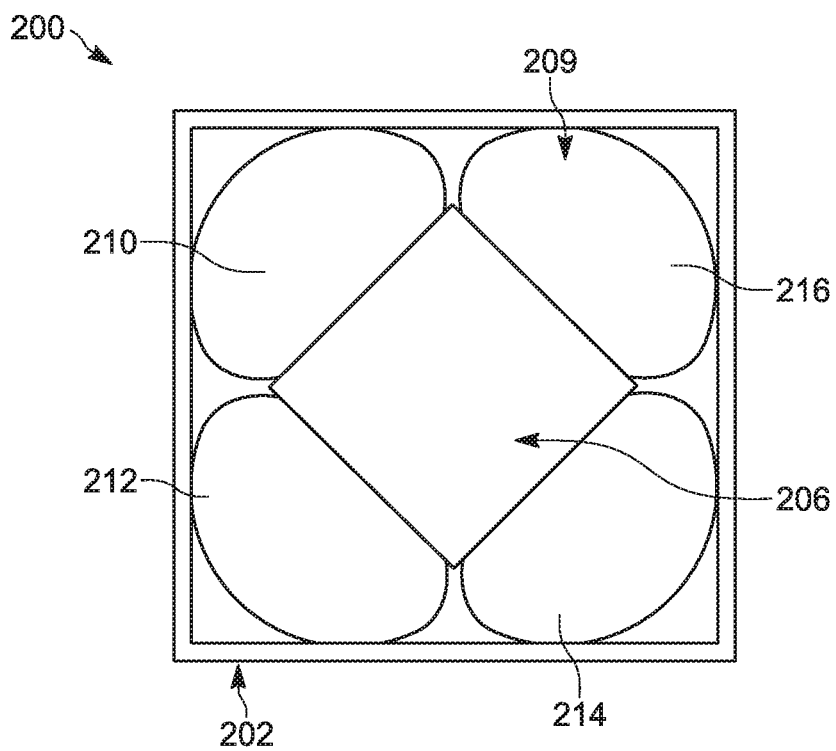
FIG. 10 is a front elevation view of a first end of an axle assembly constructed in accordance with a second example embodiment of the present disclosure.
Figure 11:
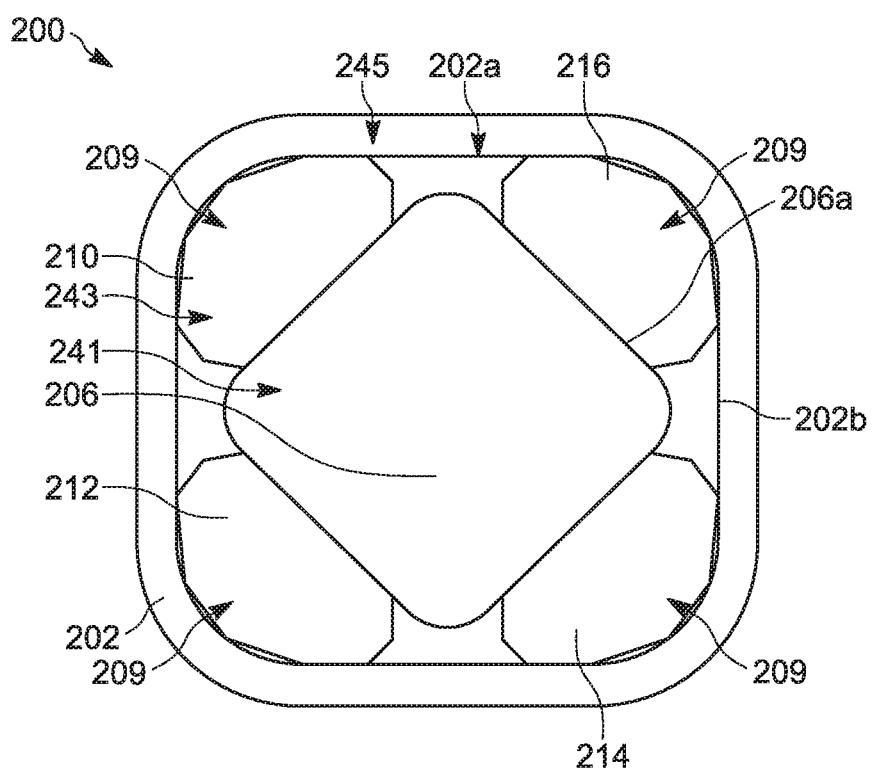
FIG. 11 is a front elevation view of a first end of an axle assembly constructed in accordance with a second example embodiment of the present disclosure.
Figure 12:
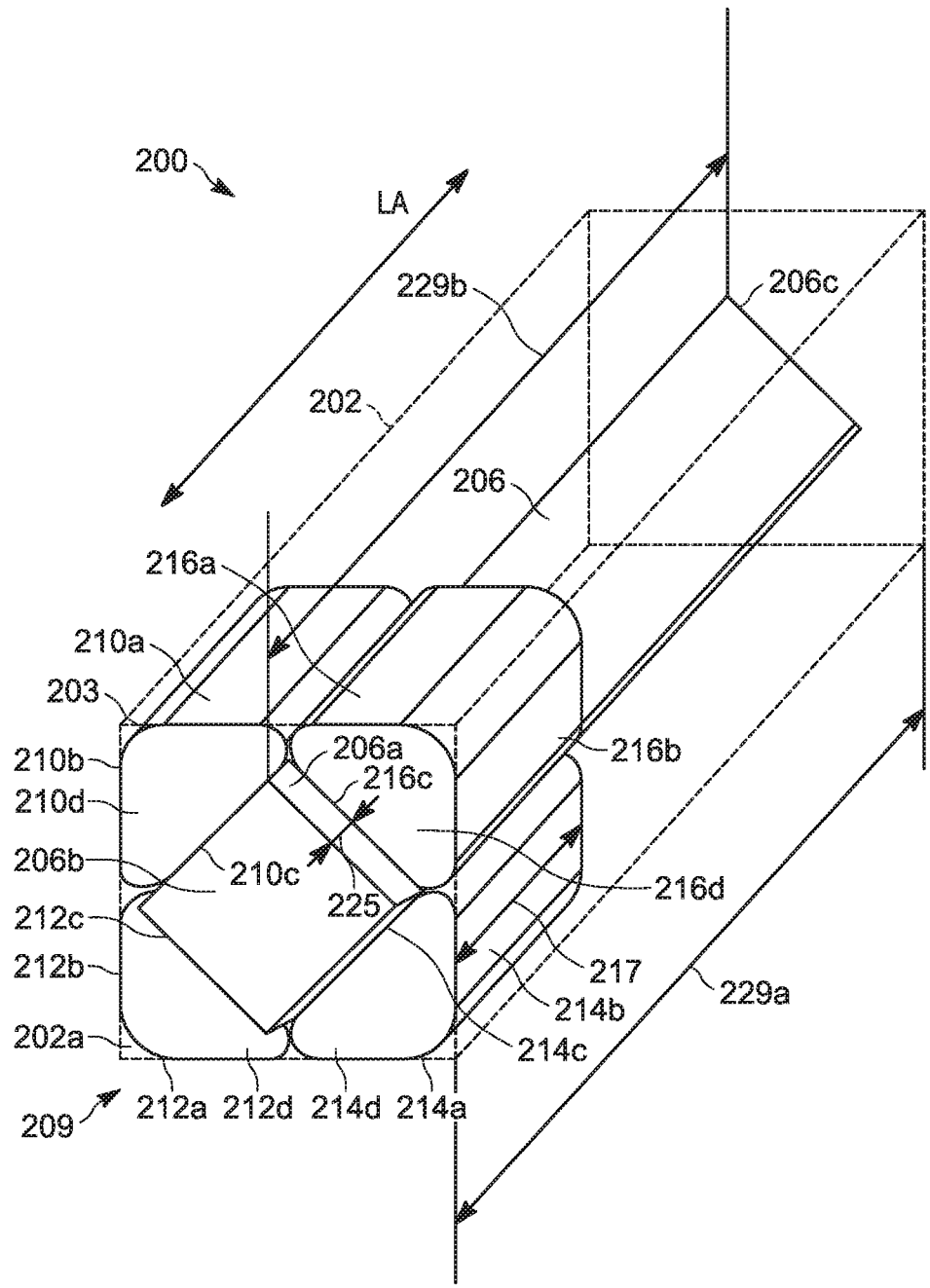
FIG. 12 is a partial front perspective view of a first end of an axle assembly constructed in accordance with a second example embodiment of the present disclosure.

Another example embodiment of the axle assembly 200 is illustrated in FIGS. 10-14. Features of the axle assembly 200 illustrated in FIGS. 10-14 that are similar to the features of the axle assembly 100 illustrated in FIGS. 1-9 will be identified by like numerals increased by a factor of one hundred, unless stated otherwise. Illustrated in the example embodiments of FIGS. 10-12 is a first end of an axle assembly 200 constructed in accordance with one embodiment of the disclosure. In the example embodiment, an axle 206 extends along a lateral axis LA and is housed within an axle housing 202, shown in phantom in FIG. 12. In the illustrated example embodiment, the axle 206 and the axle housing 202 define a quadrilateral. In another example embodiment, the axle 206 and/or the housing 202 define a square and/or a rectangular geometry. However, it would be appreciated by one of ordinary skill in the art that the axle 206 and/or the housing 202 can comprise multiple geometric shapes, such as a rectangle, a triangle, a circle, and/or other polygons.

The axle 206 comprises a first cross-sectional area 241 illustrated in FIG. 11, wherein in one example embodiment, the first cross-sectional area is between approximately 0.75 square inches to approximately 1.25 square inches. In another example embodiment, the first cross-sectional area 241 is one (1) square inch. Further, the geometric shape of the axle 206 can comprise a different geometric shape than the geometric shape of the axle housing 202. The axle housing 202 comprises a second cross-sectional area 245, wherein in one example embodiment, the second cross-sectional area is between approximately three (3.0) square inches to approximately four (4.0) square inches. In another example embodiment, the second cross-sectional area 245 is 3.4702 square inches. A shock absorber 209 is located between the axle 206 and the axle housing 202. In one example embodiment, the shock absorber 209 comprises a three-sided geometry. In another embodiment, the interaction of the shock absorber 209 with the axle 206 and/or the axle housing 202 does not alter a three-sided geometry of the shock absorber.

The shock absorber 209 supports the axle 206 within the axle housing 202. In the illustrated example embodiment of FIG. 11, a cross-section of an axle assembly 200 is shown. The axle assembly 200 and potentially the axle 206 will house hubs or spindles in which one or more wheels rotate. As the axle 206 encounters torque from the wheels and tires, the stress is absorbed or mitigated by the shock absorber 209. The shock absorber 209 comprises four flexible components 210, 212, 214, 216. In the illustrated example embodiment of FIG. 12, the four flexible components 210, 212, 214, 216 respectively, include front surfaces 210d, 212d, 214d, 216d that are facing away from a front opening 202a of the axle housing 202, first lateral surfaces 210b, 212b, 214b, 216b and second lateral surfaces 210a, 212a, 214a, 216a that interact with a housing inner surface 202b of the axle housing, inner surfaces 210c, 212c, 214c, 216c that interact with an outer axle surface 206a of the axle 206, and rear surfaces opposite the front surfaces that are substantially mirror images of the front surfaces (not shown). It would be appreciated by one of ordinary skill in the art that different numbers of flexible components can be used.

As shown in the illustrated example embodiment of FIG. 11, the flexible components 210, 212, 214, 216 comprise a shock absorber cross-sectional area 243, wherein in one example embodiment, the shock absorber cross-sectional area is between approximately 0.25 square inches to approximately 0.75 square inches. In another example embodiment, the shock absorber cross-sectional area 243 is 0.5042 square inches. In an example embodiment, the front surfaces 210d, 212d, 214d, 216d of the four flexible components 210, 212, 214, 216 are even with a first plane 203 (see FIG. 12), wherein the first end of the axle housing 202 is even with the first plane. In another example embodiment, the front surfaces 210d, 212d, 214d, and 216d of the four flexible components 210, 212, 214, 216 extend beyond the first plane 203. In yet another example embodiment, the front surfaces 210d, 212d, 214d, 216d of the four flexible components 210, 212, 214, 216 reside behind the first plane 203.

In one example embodiment, the four flexible components 210, 212, 214, 216 comprise a 55-75 Shore A material. In another example embodiment, the four flexible components 210, 212, 214, 216 comprise at least one of thermoplastic elastomer (TPE), such as thermoplastic vulcanizates (TPV) rubber, Santoprene rubber (e.g., dynamically vulcanized ethylene propylene diene monomer (EPDM) rubber in a thermoplastic matrix of polypropylene (PP)).

Figure 13A:
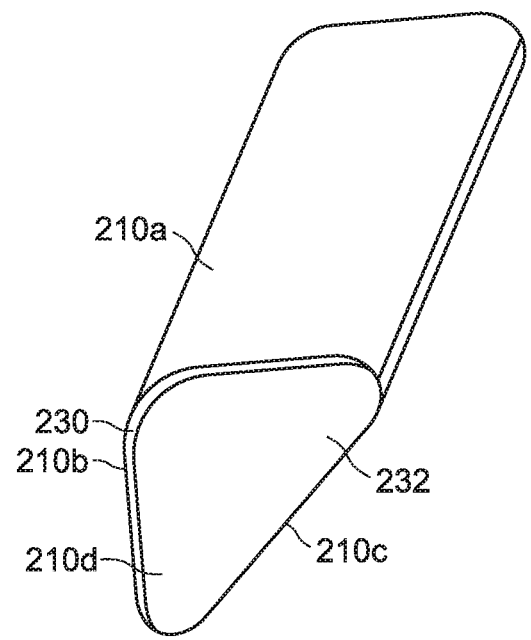
FIG. 13A is a front perspective view of a flexible component of a shock absorber comprising a slip coat constructed in accordance with a second example embodiment of the present disclosure.

As illustrated in the example embodiment of FIG. 13A, the four flexible components 210, 212, 214, 216 comprise a first elastomer body 232 and a slip coat 230. In this example embodiment, the first elastomer body 232 comprises at least one elastomer material. The elastomer material comprising at least one of thermoplastic elastomer (TPE), such as thermoplastic vulcanizates (TPV) rubber, Santoprene rubber (e.g., dynamically vulcanized ethylene propylene diene monomer (EPDM) rubber in a thermoplastic matrix of polypropylene (PP)). The first elastomer body 232 comprises a 55-75 Shore A material. The slip coat 230 extends over at least a portion of the first lateral surfaces 210b, 212b, 214b, 216b and the second lateral surfaces 210a, 212a, 214a, 216a. In one example embodiment, the slip coat 232 comprises a high-molecular weight lubricant, an example of such a lubricant is Slipcoat #11059, made by Teknor Apex.

In one example embodiment, the four flexible components 210, 212, 214, 216 are made by extruding a length of an elastomer material. In another example embodiment, the four flexible components 210, 212, 214, 216 are made by co-extruding a length of elastomer material while embedding the slip coat 230 along at least a portion of the first lateral surfaces 210b, 212b, 214b, 216b and the second lateral surfaces 210a, 212a, 214a, 216a. The slip coat 230 is made from lubricating materials having a reduced COF. In one example embodiment, a reduced COF is a level of 0.5 or less. Such materials include polypropylene or polyethylene. The slip coat 230 is combined to the elastomer material as a film layer ranging from 0.001"-0.020" and preferably 0.003"-0.005" thick. In another example embodiment, the slip coat 230 is between 0.010"-0.020" thick.

Figure 13B:
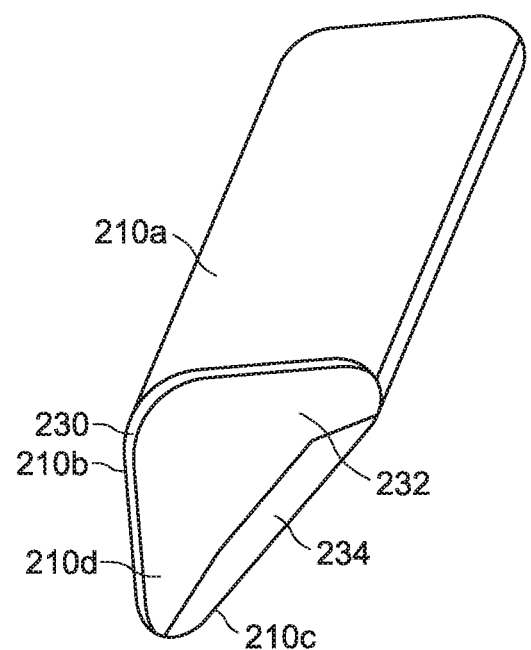
FIG. 13B is a front perspective view of a flexible component of a shock absorber comprising a slip coat and a second elastomer body constructed in accordance with a second example embodiment of the present disclosure.

As illustrated in the example embodiment of FIG. 13B, the four flexible components 210, 212, 214, 216 comprise the first elastomer body 232, the slip coat 230, and a second elastomer body 234. In this example embodiment, the second elastomer body 234 comprises at least one second elastomer material. The second elastomer material comprising a same or different material than the elastomer material. The second elastomer body 234 comprises a 35-45 Shore D material. The second elastomer body 234 extends over at least a portion of the inner surfaces 210c, 212c, 214c, 216c. In one example embodiment, the second elastomer body 234 comprises a rubber material, such as a Thermoplastic vulcanizates (TPV) rubber, an example of such a rubber material is—item No. 26970D, made by Teknor Apex.

Figure 13C:
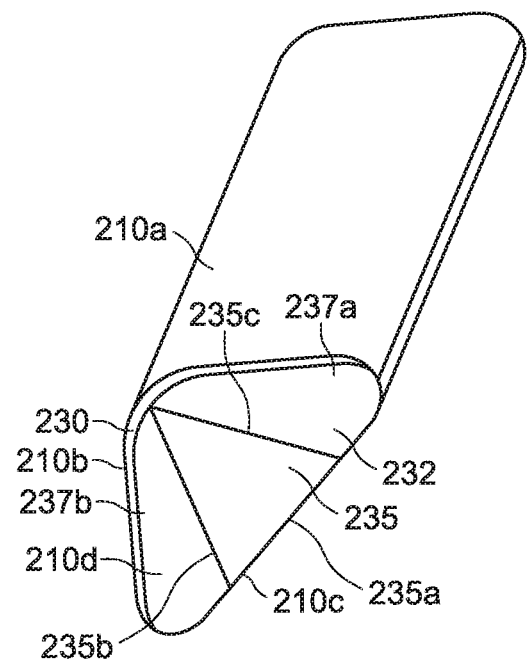
FIG. 13C is a front perspective view of a flexible component of a shock absorber comprising a slip coat, an elastomeric body, and a rigid or semi-rigid member constructed in accordance with a second example embodiment of the present disclosure.

As illustrated in the example embodiment of FIG. 13C, the four flexible components 210, 212, 214, 216 comprise the first elastomer body 232, the slip coat 230, and a rigid or semi-rigid member 235. In this example embodiment, the rigid or semi-rigid member 235 defines a triangular shape, having three faces or sides 235a, 235b, 235c coupled together by three corners. The rigid or semi-rigid member 235 comprising a rigid or semi-rigid material. In one example embodiment, the rigid or semi-rigid member 235 comprises polypropylene. In another example embodiment, the rigid or semi-rigid member 235 comprises a 60-100 Shore D material. In the illustrated example embodiment, the rigid or semi-rigid member 235 extends over at least a portion of the inner surfaces 210c, 212c, 214c, 216c. In the illustrated example embodiment, a first face 235a of the three faces extends over at least a portion of the inner surfaces 210c, 212c, 214c, 216c. In the illustrated example embodiment, the rigid or semi-rigid member 235 extends from the inner surfaces 210c, 212c, 214c, 216c to the slip coat 230.

In one example embodiment, the rigid or semi-rigid member 235 separates the first elastomer body 232 into two discrete portions, a first elastomer portion 237a, and a second elastomer portion 237b, such that a second face 235b of the three faces and a third face 235c of the three faces interact with/are in contact with the first elastomer body 232. In another example embodiment, a second corner of the three corners between the second and third faces 235b, 235c at least one of interacts with, is contagious with, or adjacent to the slip coat 230.

In this example embodiment, the four flexible components 210, 212, 214, 216 are made by tri-extruding a length of elastomer material with second elastomer material embedded along the inner surfaces 210c, 212c, 214c, 216c, while embedding the slip coat 230 along at least a portion of the first lateral surfaces 210b, 212b, 214b, 216b and the second lateral surfaces 210a, 212a, 214a, 216a. The second elastomer body 234 is combined with the elastomer material as a layer ranging from 1.0" to 3.0" inches thick. In another example embodiment, the second elastomer body 234 is combined with the elastomer material as a layer ranging from 1.5" to 2.0" inches thick. In one example embodiment, the second elastomer body 234 comprises a non-uniform thickness, wherein the second elastomer body is thicker nearest a center portion of the inner surfaces 210c, 212c, 214c, 216c and thinner as the second elastomer body extends toward the first lateral surfaces 210b, 212b, 214b, 216b and the second lateral surfaces 210a, 212a, 214a, 216a. In another example embodiment, the inner surfaces 210c, 212c, 214c, 216c comprise a high tack surface.

In one example embodiment, the method of manufacture includes, at least one elastomer material and/or second elastomer material being loaded into a first extruder and a slip coat material being loaded into a second extruder having a common extrusion die head assembly with the first extruder. In one embodiment the slip coat material could be in a granular form prior to the extrusion process. The materials are located within the respective extruders and heated to a temperature range of 350 to 425 degrees Fahrenheit, resulting in a molten state for both the elastomer material and slip coat material. Once the prescribed temperature is reached, which in one example embodiment, is slightly above or at 350 degrees Fahrenheit, the elastomer material and slip coat material are fed through the common die head assembly, forming a single flexible component 210, 212, 214, and/or 216 with the slip coat 232 embedded along a select portion of the flexible component. After which, the extrusion is typically fed through a water bath for cooling to a prescribed temperature level before being cut.

In one example embodiment, the method of manufacture includes, at least one elastomer material being loaded into a first extruder, the slip coat material being loaded into a second extruder, and the second elastomer material being loaded into a third extruder, the second and third extruders having a common extrusion die head assembly with the first extruder.

In another embodiment, the slip coat 230 is preformed prior to the extrusion process. As such, slip coat material remains in a solid state during the heating and extruding processes while being formed with the elastomer material or materials. In another embodiment, the slip coat material is applied to by spraying the film on the molten elastomer material just after the extrudate passes through the die head in the coextrusion or tri-extrusion process. The slip coat being sprayed can include ultraviolet cured films. Such an example of an ultraviolet film would include, for example, polyether acrylate with 50% nano-scale silica currently being sold by BASF Coatings AG under the tradename LAROMER® PO 9026 V. Other types of suitable spray films can be films capable of being chemically or thermally cured. In yet another embodiment, the first elastomer body 232 and/or the second elastomer body 234 comprise one or more elastomer materials have differing compositions and durometer values.

In one example embodiment, a first end 206b of the axle 206 extends beyond the first plane 203 (see FIG. 11) a first distance 225. Wherein in one example embodiment, the first distance 225 is between approximately one-half 0.50" inch to approximately three 3" inches. In another example embodiment, the first distance 225 is two 2" inches. In yet another example embodiment, the shock absorber 209 extends a first axle distance 217 into the axle housing 102 parallel to the lateral axis LA. In one example embodiment, the first axle distance 217 is between approximately six 6" inches to approximately thirty 30" inches. In another example embodiment, a second end (not shown) of the axle assembly 200 is substantially the same as the first end. That is, the axle 206 extends laterally at least the length of the axle housing 202, and a second shock absorber, that is substantially the same as the shock absorber 209, supports the axle in the axle housing at the second end in the same manner described above with regards to the first end. In yet another example embodiment, the shock absorber 209 extends a housing length 229a of the axle housing 202 and/or an axle length 229b of the axle 206. In yet another example embodiment, the shock absorber 209 extends less than or equal to the housing length 229a and/or the axle length 229b.

An axle casting or trailing arm 224 (see FIG. 14), comprising an axle opening 227, is fitted over the protruding end of the axle 206, such that the axle is coupled to the axle casting 224 via the axle opening. In one example embodiment, an inner surface of the axle casting 224 is flush with the front surfaces 210d, 212d, 214d, 216d of the four flexible components 210, 212, 214, 216.

Figure 15:
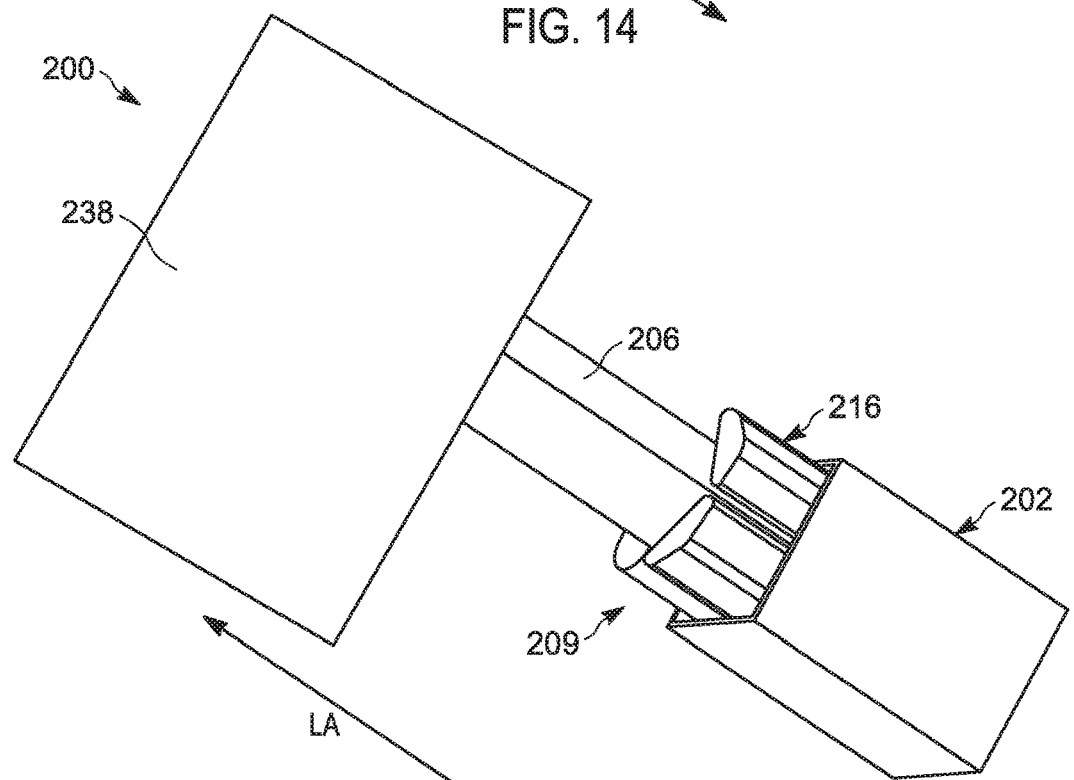
FIG. 15 is a partial side perspective view of a press used to assemble an axle assembly in accordance with second example embodiment of the present disclosure.

In the illustrated example embodiment of FIG. 15, a press 238, such as a cylinder press, powers the insertion of the axle 206 and the shock absorber 209 into the axle housing 202. In one example embodiment, the four flexible components 210, 212, 214, 216 are arranged around the axle 206 such that the inner surfaces 210c, 212c, 214c, 216c are in contact with the axle, and the first lateral surfaces 210b, 212b, 214b, 216b and the second lateral surfaces 210a, 212a, 214a, 216a are facing outwardly away from the axle. In an example embodiment, a coupler 231 (e.g., an adhesive band, a tension band, etc.) is looped around the first lateral surfaces 210b, 212b, 214b, 216b and the second lateral surfaces 210a, 212a, 214a, 216a to maintain the relative location of the four flexible components 210, 212, 214, 216 with regard to the axle 206. The axle 206 and the positioned four flexible components 210, 212, 214, 216 are aligned with the front opening 202a of the axle housing 202, wherein the press 238 applies force to insert the axle and the positioned four flexible components into the axle housing. In one example embodiment, the press 238 applies pressure to the axle casting 224 to insert the axle 206 and the shock absorber 209 into the axle housing 202.

Force is applied to the axle 206 and the shock absorber 209, wherein the slip coat 230 facilitates easy entry of the shock absorbers by reducing friction with the housing inner surface 202b (see FIG. 11). Further, the second elastomer body 234 maintains a frictional interaction with the outer axle surface 206a preventing movement of the shock absorber 209 relative to the axle 206. In one example embodiment, the fabrication of the axle assembly 200 is performed at room or ambient temperature. In one example embodiment, the fabrication of the axle assembly 200 does not change the relative geometric shape (e.g., number of sides) of the flexible components 210, 212, 214, 216.

Figure 14:
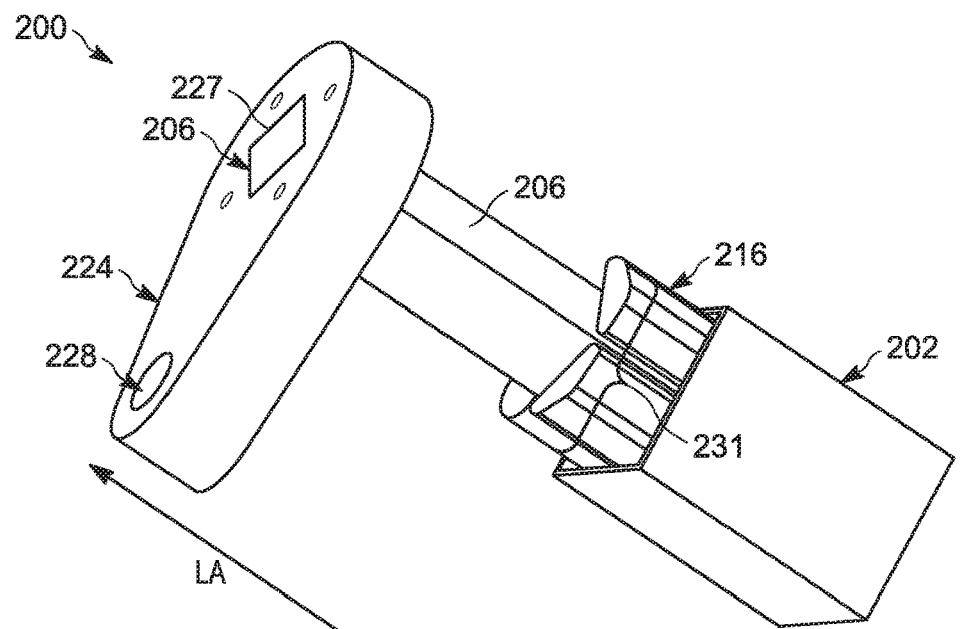
FIG. 14 is a partial side perspective view of an axle assembly comprising a wheel attachment constructed in accordance with second example embodiment of the present disclosure.

In the illustrated example embodiment of FIG. 14, the axle casting 224 comprises a wheel assembly opening 228. In an example embodiment, a wheel assembly is coupled to the axle casting 224 via the wheel assembly opening 228.

In one example embodiment, the shock absorber 209 absorbs a significant amount of shock, negating a need for leaf springs, coil springs, dampers, or other additional types of shock absorption when in use in a trailer or other motor vehicle. Further, the axle assembly 200 is assembled at room temperature reducing assembly costs as compared to axles that use freezing or heating in the axle assembly fabrication process. Additionally, because different components do not have to be assembled within a specific timeframe, such as within ninety (90) seconds of undergoing a freezing operation, the fabrication of the axle assembly 200 is easier and safer, and results in less damaged or unusable materials. Moreover, the three-sided shape of the flexible components 210, 212, 214, 216, that comprise the shock absorber 209, allow for selective interaction of materials, such as the slip coat 230 interacting with the housing inner surface 202b to reduce friction and ease assembly, while the second elastomer body 234 interacts with the outer axle surface 206a to prevent relative movement of the axle 206 relative to the shock absorber 209. Traditionally, shock absorbers are formed of cylindrical cords, rendering all sides of the cord the same. Lubricant cannot be incorporated into the round cord to reduce friction during assembly, as the lubricant would cause slippage with regard to the axle 206 and the orientation of the cord cannot be maintained. Such an axle would have a high axle twist, and cause difficulties and misalignment within the axle housing 202. The three-sided shape of the shock absorber 209 allows for selective lubricant application without the sealing.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Any document referenced herein is incorporated by reference in its entirety and for all purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:
1. An axle assembly comprising:
an axle having a first geometric shape housed within an axle housing having a second geometric shape;
a shock absorber between the axle and the axle housing, the shock absorber supporting the axle within the axle housing, the shock absorber comprising a first material and a three-sided configuration, the first geometric shape and the second geometric shape comprising quadrilaterals, the shock absorber defining a first lateral side, a second lateral side, and an inner side, the shock absorber comprising a slip coat solely covering at least one of the first lateral side and the second lateral side, the first lateral side and the second lateral side in contact with the axle housing.

2. The axle assembly of claim 1, the shock absorber comprises one or more flexible components, each of the one or more flexible components comprising the first lateral side, the second lateral side, and the inner side.

3. The axle assembly of claim 2, wherein the slip coat comprises a high-molecular weight lubricant material.

4. The axle assembly of claim 2, wherein the slip coat is co-extruded with the first material.

5. The axle assembly of claim 2, comprising a second material covering at least a portion of the inner side, the inner side in contact with the axle when assembled.

6. The axle assembly of claim 2 wherein the slip coat is tri-extruded with the first material and the second material.

7. The axle assembly of claim 2, comprising a rigid material extending along at least a portion of the inner side, the inner side in contact with the axle when assembled.

8. The axle assembly of claim 7, wherein the rigid material comprises a 60-80 Shore D material.

9. The axle assembly of claim 7, wherein the rigid material extends from the inner side to at least one of the first and second lateral sides.

10. The axle assembly of claim 7, wherein the rigid material defines a triangular shape that extends from the inner side to the slip coat.

11. The axle assembly of claim 1, wherein the shock absorber is located at a first end of the axle housing and a second shock absorber is located at a second end of the axle housing, the second shock absorber supporting the axle within the axle housing, the second shock absorber comprising the first material.

12. The axle assembly of claim 1, wherein the first material comprises a 55-75 Shore A material.

13. The axle assembly of claim 1, wherein, the first geometric shape of the axle is different from the second geometric shape of said axle housing.

14. An axle assembly comprising:
an axle having a first geometric shape housed within an axle housing having a second geometric shape;
a shock absorber between the axle and the axle housing, the shock absorber comprises one or more flexible components, each of the one or more flexible components comprising at least a first lateral side, a second lateral side, and an inner side, the shock absorber supporting the axle within the axle housing, the first geometric shape and the second geometric shape comprising polygons, the one or more flexible components comprising a first material, the one or more flexible components further comprising a slip coat covering at least one of the first lateral side and the second lateral side, the slip coat covering the first lateral side and the second lateral side in contact with the axle housing when assembled, the first material of the inner side in contact with the axle when assembled.

15. The axle assembly of claim 14, wherein the slip coat comprises a high-molecular weight lubricant material that is co-extruded with the first material.

16. The axle assembly of claim 14, comprising a rigid material extending along at least a portion of the inner side, the inner side in contact with the axle when assembled.

17. The axle assembly of claim 16, wherein the slip coat is tri-extruded with the first material and the rigid material, the rigid material comprising a 80-95 Shore D material.

18. The axle assembly of claim 16, wherein the rigid material defines a triangular shape having first, second, and third sides, wherein the first side extends along at least a portion of the inner side, the second and third sides interact with the first material.

19. The axle assembly of claim 18, wherein a first corner between the second and third sides of the rigid material interacts with the slip coat, and separates the first material into two discrete bodies.

20. An axle assembly comprising:
an axle having a first geometric shape housed within an axle housing having a second geometric shape;
a shock absorber between the axle and the axle housing, the shock absorber comprises one or more flexible components, each of the one or more flexible components comprising a first lateral side, a second lateral side, and an inner side, the shock absorber supporting the axle within the axle housing, the first geometric shape and the second geometric shape comprising polygons;
the one or more flexible components further comprising:
a rigid material comprising a 60-80 Shore D material, at least a portion of the rigid material in contact with the axle when assembled;
a first material comprising a 55-75 Shore A material, the first material supported by the rigid material; and
a slip coat supported by the first material, the slip coat covering at least one of the first lateral side and the second lateral side comprising the first material, the first lateral side and the second lateral side in contact with the axle housing when assembled.

21. A method of manufacturing an axle assembly comprising the steps of:
providing an axle housing for positioning an axle within an internal opening surrounded by at least one wall;
providing an axle that is inserted into said axle housing;
positioning a shock absorber between said axle and said axle housing;
forming the shock absorber from one or more flexible components, each of the one or more flexible components comprising a lateral side and an inner side, the one or more flexible components comprising a rigid material extending along at least a portion of the inner side, the shock absorber supporting the axle within the axle housing, the inner side in contact with the axle;
the one or more flexible components further comprising a first material having a first elasticity value and the rigid material having a second elasticity value wherein said first elasticity value is not equal to said second elasticity value; and
applying a coating along at least a portion of said first material such that at least a portion of said coating is in contact with said axle housing when assembled.

* * * * *